Jan. 19, 1965  N. G. COLE, JR  3,166,116

SCREEN FOR MOTOR VEHICLES

Filed Aug. 30, 1962

INVENTOR.
NORMAN G. COLE, JR.

BY

*Towson Price*

ATTORNEY

3,166,116
SCREEN FOR MOTOR VEHICLES
Norman G. Cole, Jr., 367 Little Falls Road,
Cedar Grove, N.J.
Filed Aug. 30, 1962, Ser. No. 220,367
7 Claims. (Cl. 160—40)

This invention relates to insect screens for covering one or more of the openings in or windows of a motor vehicle, especially when said vehicle is parked, as when the occupants are viewing a picture in a drive-in theater.

During the viewing of a picture in a drive-in theater, the occupants of a parked vehicle are frequently subjected to annoyance from mosquitos and other insects. By using a screen embodying my invention, protection is afforded from insects, thereby eliminating the need for undesirable spraying with chemicals to kill the insects.

An object of my invention is to provide a screen for automobiles and other vehicles, with clips by means of which the screen may be easily and quickly mounted over, or removed from, such a window.

Another object of my invention is to provide a screen which may be quickly and easily installed, as for instance, over the opening in an automobile door which has a vertically-movable glass pane or panel, with means for gripping the upper edge portion of said panel to hold the screen in place.

A further object of my invention is to provide a screen of a size such that it is universal, that is, it will fit openings of different sizes in automobile doors and the like.

A still further object of my invention is the provision of a screen, for the window or door openings for closed types of automobiles, designed to filter the air entering the same and prevent the passage of insects and other undesirable objects.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views.

Figure 1:
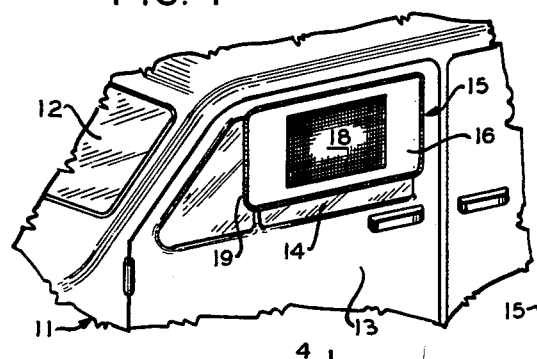
FIGURE 1 is a perspective view of the portion of an automobile at the front door adjacent the driver's side, to which a screen embodying my invention has been attached.
Figure 2:
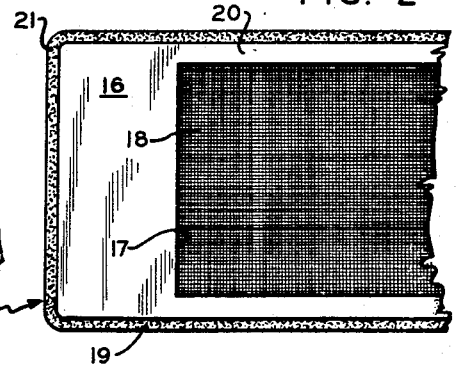
FIGURE 2 is a fragmentary outside elevational view of the screen of FIGURE 1, to a larger scale.
Figure 3:
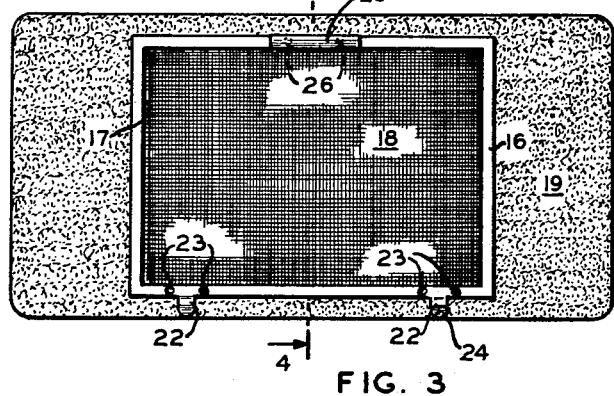
FIGURE 3 is a view corresponding to FIGURE 2 but not fragmentary and showing the inside of the screen.

Referring to the drawings in detail, and first considering the embodiment of my invention illustrated in FIGURES 1 to 4, inclusive, there is shown a motor vehicle 11 the windshield of which is indicated at 12 and the left front door at 13. The door 13, which may be conventional, is provided with a glass pane or panel 14 which is movable up and down, as by means of a conventional crank at the inside of the door, not shown. This panel 14 is shown in partly lowered position in FIGURE 1, so as to leave open the front window at the driver's side of the car. Covering this opening is a framed screen 15 embodying my invention.

The framed screen 15 desirably comprises a wood or metal frame 16 having an opening 17 closed by a screen 18 of mesh small enough to exclude undesirable insects such as mosquitos. The screen 18 may be woven from metal wires or other suitable filamentary material. The peripheral portion of said screen 18 may be attached to the inner peripheral surface of the frame 16 by conventional means, not shown. Attached to the inside of the frame, as by adhesive or other suitable means, is a pad of generally flat packing material, which may be sponge rubber, foamed plastic or other similar resilient material 19. This entirely covers the outer peripheral inside surface of the frame 16 and desirably projects a slight distance therebeyond around its periphery, as at 21. For that purpose, the frame has its outer peripheral portion of less thickness than the part inwardly thereof, forming an outwardly projecting flange 20 defining a ledge to which the packing material 19 may be attached. The inner peripheral edge of said packing material 19 desirably abuts and is secured to the outer peripheral surface of the thicker part of the frame 16, as viewed in FIGURE 4, around the entire periphery.

The length and height of the frame 16, with its carried flat packing 19, is desirably such that it will cover any automobile window or opening to which it would be applied so it may be used universally with automobiles. The size of the screen opening 17 is such that it corresponds with the smallest window or opening of a vehicle with which it is to be used, thereby leaving a relatively wide margin between the screen 18 and the outer periphery of the resilient packing material 19. The purpose of the packing material 19 is to seal the space between the framed screen 15 and the outer normally vertical surface of the vehicle with which used, without marring the paint or finish of said vehicle.

Figure 4:
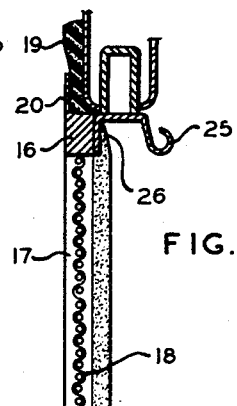
FIGURE 4 is a vertical sectional view of the screen to a larger scale and on the line 4—4 of FIGURE 3, in the direction of the arrows.

The means for holding the framed screen in place desirably takes the form of a plurality of, such as two, resilient window clamps 22. These may be formed of spring metal and have upper portions secured to the frame 16, as by means of rivets or screws 23. Their lower or depending portions 24 are adapted to overlie and resiliently engage the upper edge portion of the window pane 14 and hold the packing 19 thereagainst, as shown most clearly in FIGURE 4, thereby securing the framed screen in place at its bottom edge. The top edge of the framed screen 15 is held in place, after mounting it over the top edge portion of the window pane 14, as shown in FIGURE 4, by slightly raising said pane until the inner edge of the frame, or a handle portion 25 thereof, engages the edge of the vehicle window frame defining the top of the window opening. The handle portion 25 desirably takes the form of a hook or turned up end element, as shown in FIGURE 4, provided with a base portion secured to the frame 16 as by means of screws or rivets 26. The hook portion may serve as a rest for a speaker or earphone.

Figure 5:
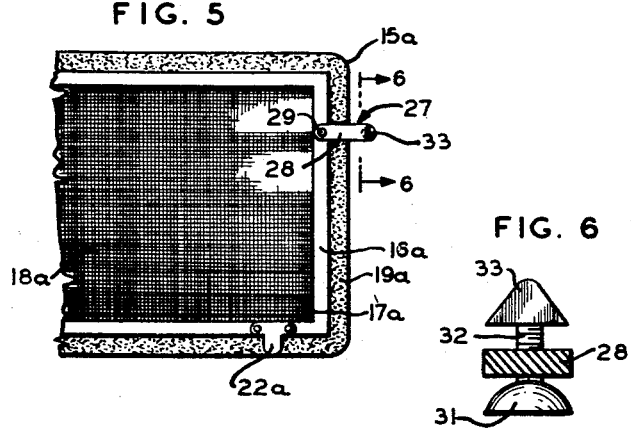
FIGURE 5 is a fragmentary elevational view corresponding to FIGURE 3, but fragmentary and showing a modification.
Figure 6:
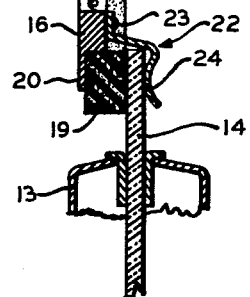
FIGURE 6 is an enlarged vertical sectional view on the line 6—6 of FIGURE 5, in the direction of the arrows, but turned 90° clockwise.

Referring now to the embodiment of my invention illustrated in FIGURES 5 and 6, there is shown a framed screen 15a comprising a wood or metal frame 16a having an opening 17a closed by a screen 18a of mesh small enough to exclude undesirable insects, as in the first embodiment. The screen 18a may be woven from metal wires or other suitable filamentary material and attached to the frame 16a by suitable means which may be conventional.

As in the preceding embodiment there is attached to the inside of the frame, as by adhesive or other suitable means, a pad of packing material, which may be sponge rubber, foamed plastic or other similar resilient material 19a. This entirely covers the outer peripheral surface of the frame 16a, and desirably projects a slight distance therebeyond around its periphery, as in the preceding embodiment. For that purpose, the frame may be flanged, as described in connection with the preceding embodiment, and the packing may be attached with the inner peripheral edge thereof abutting and secured to the outer peripheral surface of the thicker part of the frame 16a, around the entire periphery.

The length and height of the frame 16a, with its carried packing 19a, may be such that it will cover any automobile window or opening to which it would be applied, so that it may be used universally with automobiles as in the preceding embodiment. In the present embodiment, however, I have shown the framed screen with its packing shorter than the overall length of about 28″ suggested as a non-limiting dimension for the device of the preceding embodiment, but without change in a suggested overall height of about 14″, with the frame 16a of the screen 18a proper having a suggested overall length of about 17″ and an overall height of about 12″, and provided with additional means for holding it in place. That is, in addition to the plurality of, such as two, resilient window clamps 22a at the bottom of the device which act like the window clamps 22 of the preceding embodiment, I may provide the device with a clamp 27 at each side.

Said clamps 27 desirably each comprises an elongated metal member 28, one end of which is pivoted to the frame 16a, as at 29, and the free end of which carries a suction cup 31. The cup 31 is mounted on the end of a threaded stud 32 which projects therefrom through the member 28, which it threadably engages. The other end of the stud 32 is headed, as indicated at 33. The head 33 is desirably formed with generally flattened sides so as to be grasped between thumb and finger for adjustably positioning the suction cup 31 with respect to the clamp.

In use, the device is first applied to an automobile window or the like while the clamps 27 are swung upwardly or downwardly from the generally horizontal position illustrated in FIGURE 5. After the device is fitted, as in the first embodiment, the clamps are swung to the generally horizontal position illustrated and the suction cups 31 tightened against the inner surface of the automobile defining the window which is covered by the device, so as to hold the device in place. Except as specifically described in connection with the present embodiment, the same may correspond with that of the first embodiment.

From the foregoing, it will be seen that the primary purpose of my framed screen is to provide one that is adaptable to most American automobiles. Previous designs require the screen to fit inside the window frame. My screen will fit narrow windows determined by the width of the bottom clamps and wide windows determined by the length of the side frames. The non-limiting suggested dimensions which have been given are what appear to be desirable at this time. As some automobile window sizes change and models become obsolete, it might become desirable or necessary to change the dimensions, or to add an extension horizontally or vertically in the event of a needed increase.

An ideal use for this screen is on automobiles in drive-in theaters where different automobiles would require the use of the same screen. It would also eliminate the need for undesirable mosquito spraying. The twofold purpose of the handle and speaker rest, which is generally supplied by the window, adds to its usefulness at drive-ins. The rotating or swinging clamps may be used instead of the handle to provide greater support.

The sponge rubber is used to conform to the surface and protect the finish of the automobile. It is attached by glue or other adhesive. The handle, clips, clamps, may be attached by nuts and bolts, rivets, screws, or brazing. Any suitable corrosive and/or rust resistant material may be used. Aluminum seems the most desirable at this time.

Having now described my invention in detail in accordance with the requirements of the Patent Statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A framed screen, removably attachable over an opening in a vehicle, comprising a screen, a generally rectangular frame to the inner peripheral surface of which the peripheral portion of said screen is attached flat packing means disposed around the inner surface of and near the periphery of said frame, to close the space between said frame and the normally vertical surface of said vehicle around said opening, so as to fit vehicles with openings of different sizes, and metal spring clips extending inwardly beyond the plane of the inner surface of the packing means from the inner surface of the frame near its inner periphery adjacent the bottom edge of said screen to depend over and resiliently engage the upper edge portion of a window pane movable in the opening.

2. A framed screen as recited in claim 1, wherein the packing means consists of sponge rubber.

3. A framed screen as recited in claim 1, wherein the frame of said screen has an outwardly extending flange and the packing lies in the angle between said flange and the body of said frame.

4. A framed screen as recited in claim 1, wherein the frame of said screen is provided with an inwardly extending handle with a portion adapted to underlie the element defining the upper outline of said window and an extension therebeyond to be manually grasped.

5. A framed screen as recited in claim 1, with an overall length of about 28″, an overall height of about 14″, and wherein the frame of the screen proper has an overall length of about 17″ and an overall height of about 12″, whereby it is adapted for universal application with respect to openings in motor vehicles which are to be covered thereby.

6. A framed screen as recited in claim 1, wherein clamps are provided at the sides of said screen frame, each clamp being swingable about a normally horizontal axis, and a suction cup threadably mounted with respect to an end portion of each clamp so as to be adjustable with respect thereto for connection wtih the adjacent portions of a motor vehicle.

7. A framed screen, removably attachable over a window opening in a vehicle, comprising flat resilient packing means disposed around the periphery of said screen, to conform to the normally vertical flat surface of the vehicle around the window opening and close the space between said periphery and said surface, so as to fit vehicles with openings of different sizes, resilient clips disposed near the bottom edge of said screen to clamp the inner surface of said packing means against the outer surface of the upper edge portion of a window pane in the window opening, swingable clamps at the side edges of said screen, and thumb screw means adjacent the free end portions of said clamps for adjustably holding said screen in place with respect to said vehicle.

References Cited by the Examiner
UNITED STATES PATENTS

| | | | |
|---|---|---|---|
| 1,172,320 | 2/16 | Tholstrup | 160—369 |
| 1,608,785 | 11/26 | Evans | 160—40 |
| 1,798,600 | 3/31 | Gooch | 160—105 |
| 1,863,428 | 6/32 | Westrick | 160—105 |
| 1,955,648 | 4/34 | Nickles | 160—369 |
| 2,263,813 | 11/41 | Mason | 160—40 |
| 2,280,389 | 4/42 | Edwards | 160—40 |
| 2,576,777 | 11/51 | Clements | 160—40 |
| 2,615,515 | 10/52 | Hoffman | 160—369 |
| 2,646,118 | 7/53 | Berty | 160—369 |
| 2,722,978 | 11/55 | Frisk | 160—369 |
| 2,805,712 | 9/57 | McVicker | 160—369 |
| 2,809,728 | 10/57 | Olson | 20—55 |
| 2,850,087 | 9/58 | Janaman | 160—229 |

NORTON ANSHER, *Examiner.*

HARRISON R. MOSELEY, *Primary Examiner.*